THERMISTOR BIASING CIRCUIT
Filed March 12, 1965
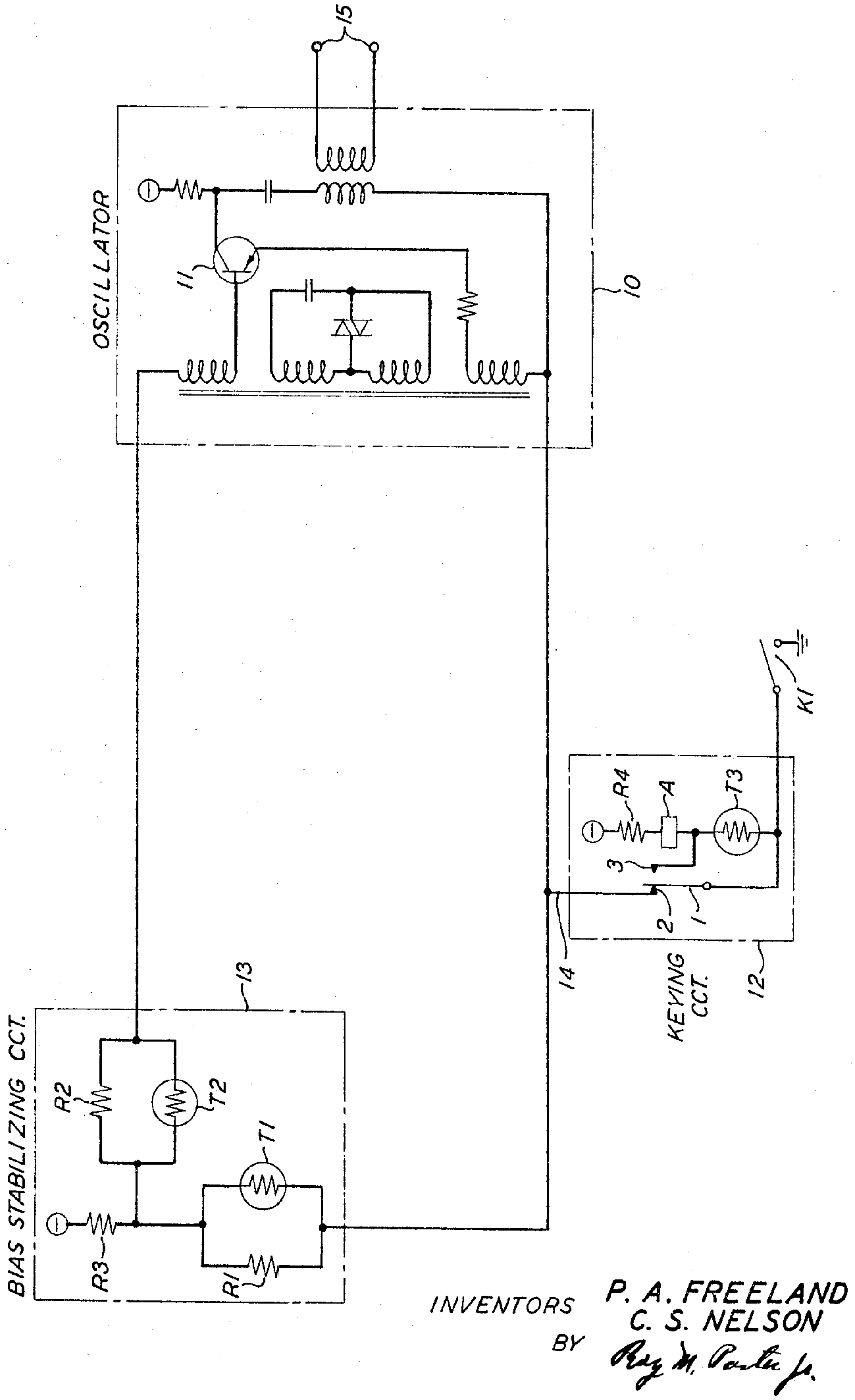
INVENTORS P. A. FREELAND
C. S. NELSON
BY Roy M. Porter Jr.
ATTORNEY

3,270,294
THERMISTOR BIASING CIRCUIT

Paul A. Freeland, Naperville, and Charles S. Nelson, Chicago, Ill., assignors to Western Electric Company, Incorporated, New York, N.Y., a corporation of New York Filed Mar. 12, 1965, Ser. No. 439,350
6 Claims. (Cl. 331—108)

This invention relates to transistor circuits and more particularly to circuits for stabilizing transistors against the effect on transistor operating point of varying ambient temperature.

Transistor circuits frequency operate in environments wherein the ambient temperature varies over a substantial range. In conditions such as these the quiescent collector current is subject to wide variation since a component of this current is the collector cutoff current $I_{CO}$ which increases exponentially with temperature. In many situations it is essential that the quiescent current remain substantially independent of temperature since the power output which is a function of the operating point or quiescent current value may be required to be a constant.

A recognized difficulty in obtaining a simplified compensating circuit exists by virtue of the difficulty in obtaining temperature dependent elements having characteristics which complement the exponential characteristics described over the range of possible temperature variation to be experienced.

Accordingly, it is an object of this invention to provide an improved biasing circuit for stabilizing the operating point of a transistor against changes in ambient temperature.

A feature of the present invention is the use of a pair of thermistors each of which is connected in parallel to a resistor of a value particularly chosen with respect to the resistance of its associated thermistor over a given temperature range to control the base current over a range of ambient temperature variation. As temperature is increased one parallel combination drives the transistor towards cutoff from its initial forward biased operating point and the other parallel combination acts to prevent cutoff in the upper region of the temperature range by reducing the base circuit impedance.

In accordance with the objects and features of the invention the biasing arrangement is shown in an embodiment which includes a keyed transistor oscillator. The output power of the oscillator is stabilized against temperature variations by means of the bias circuit which employs a pair of thermistors having identical negative temperature characteristics. One of the thermistors appears in a voltage divider circuit to provide a voltage which tends to diminish the forward bias by adjusting the base emitter junction voltage towards its cutoff value as the ambient temperature increases, while the second thermistor is connected in the base circuit of the transistor to provide decreased base circuit impedance as the transistor approaches cutoff. The thermistor in the voltage divider has connected in parallel a resistance having a value comparable to the value of the thermistor resistance in the lower portion of its temperature range and the thermistor in the base circuit has a resistor in parallel with it of value comparable to the resistance of the thermistor over its upper temperature range.

A further understanding of the invention may be secured from the detailed description hereinbelow in connection with the accompanying drawing which shows in the sole figure in schematic form the bias equalizing circuit in connection with a keyed transistor oscillator circuit.

Referring now to the sole figure there is shown for illustrative purposes oscillator 10 employing transistor 11 and keying circuit 12. The oscillator is similar to that shown in Patent 3,184,554, issued to L. A. Meacham et al. on May 18, 1965 and further disclosed and described in FIG. 6B on page 246 of volume 39 of the Bell System Technical Journal.

In response to the closure of switch K1 under an external control, the power supply circuit is completed through the ground transmitted to conductor 14 through the normally closed transfer contacts 1 and 2 of relay A to simultaneously activate the bias stabilizing circuit 13 and oscillator 10 whose generated signal appears at output 15. The closure of switch K1 also permits current to flow to the series circuit which includes the winding of relay A and thermistor T3. Initially this currrent is insufficient to operate relay A, but after a timed duration as determined by the negative temperature characteristics of thermistor T3, the current exceeds that required to energize relay A whereupon ground is removed from conductor 14 and oscillations cease.

During the time of sustained oscillation from oscillator 10, biasing circuit 13 acts to stabilize the output power of the oscillator in the face of changing ambient temperatures by controlling the quiescent operating point fixed for class A operation. This is accomplished by means of the arrangement which includes thermistor T1 connected in parallel with resistor R1 and thermistor T2 connected in parallel with resistor R2. Each of the thermistors has a negative characteristic over the range of temperature ambient variation. Resistor R1 in parallel with thermistor T1 functions as part of a voltage divider circuit connected between battery and ground which includes resistor R3. As temperature increases, the voltage across the parallel combination of T1 and R1 decreases in magnitude and the potential at point *a* approaches ground. This change in voltage tends to decrease the forward bias on the base emitter junction of transistor 11 and therefore tends to drive the transistor towards cutoff. Resistor R1 is selected to have a value comparable to the resistance of thermistor T1 in the lower region of its temperature characteristic in order to properly compensate for the change in collector cutoff current $I_{CO}$ over the lower temperature region of ambient variation. However, if it were not for the provision of additional compensating elements R2 and T2, as the upper region of ambient temperature is approached and the resistance presented by thermistor T1 becomes very much smaller than that of resistor R1, the incremental change in voltage at point *a* increases and transistor 11 would be driven more rapidly towards cutoff since the base current is now being decreased at a faster rate than that required to compensate for the increase in collector current due to the increase in $I_{CO}$. Thermistor T2 is selected to have a negative temperature characteristic substantially identical with that of thermistor T1 but resistor R2 is selected to have a value comparable to the resistance of thermistor T2 in the upper region of its characteristic. Because of this selection, in the lower regions of temperature variations, thermistor T2 appears as an open circuit when compared with resistor R2 and the base circuit impedance is not altered by this circuit combination. However, as the upper regions of temperature are approached and the resistance of thermistor T2 becomes comparable to the resistance of resistor R2, the base circuit impedance of impedance 11 is significantly decreased to prevent cutoff. In other words, although the voltage at point *a*, which is approaching ground, is tending to decrease the forward bias on the emitter base junction, the base impedance is sufficiently decreased to act as a partial counterbalance and thereby prevent cutoff.

Thus, the net effect of the bias stabilizing circuit 13 is to decrease by a controlled amount the base current of transistor 11 in the face of rising $I_{CO}$ caused by increasing temperature to thereby offset the increase in collector current which is a function of $I_{CO}$.

While a transistor oscillator circuit was shown to illustrate the effect of the bias stabilizing circuit, the same stabilizing effect is equally applicable to any transistor amplifier configuration. Moreover, while the thermistors were chosen so that both presented negative temperature characteristics, by rearranging the position of thermistor T1 in the voltage divider circuit, a thermistor having a positive thermistor characteristic can be utilized. Finally, while thermistors T1 and T2 were described as having substantially identical temperature characteristics, a rearrangement of the values of the elements of the invention may be effected to provide temperature stabilization according to the teachings of the invention with thermistors having dissimilar characteristics.

It is understood that the above-described arrangements are illustrative of the application of the principles of the invention. Numerous other arrangements may be devised by those skilled in the art without departing from the spirit and scope of the invention.

What is claimed is:

1. In combination with a transistor having a fixed operating point, a biasing circuit including a direct-current source of supply for stabilizing said operating point over a range of ambient temperature variation comprising means connected to said source for obtaining a voltage for driving said transistor towards cutoff with increasing ambient temperature including a resistive voltage divider having an arm consisting of the parallel combination of a first temperature sensitive resistor exhibiting substantial variation in value over said ambient temperature range and a resistor having a value comparable to the resistance of said temperature sensitive resistor at a temperature in the lower region of said range and means included in the base circuit of said transistor and connected to said voltage divider for preventing the cutoff of said transistor with increasing temperature including the parallel combination of a second temperature sensitive resistor having a negative temperature characteristic over said range of ambient variation and a resistor having a value comparable to the resistance of said temperature sensitive resistor at a point in the upper portion of said characteristic.

2. A combination in accordance with claim 1 wherein said first and second temperature sensitive resistors consist of a nonlinear element having a negative temperature characteristic.

3. In combination with a transistor having base, emitter and collector electrodes, a biasing circuit for stabilizing the operating point of said transistor over a range of ambient temperature variation comprising a source of direct-current supply for forward biasing said base emitter electrodes and for back biasing said collector and base electrodes, means for obtaining a voltage for decreasing the forward bias between said base and emitter electrodes with increasing ambient temperature including the circuit connected to said supply consisting of a resistor in series with the parallel combination of a first nonlinear resistor having a negative temperature characteristic over said ambient temperature range and a resistor having a value comparable to the resistance of said first nonlinear resistor at a point within the lower temperature region of said characteristic and means coupling said last-mentioned means to said base electrode for preventing the cutoff of said transistor with increasing temperature including a second nonlinear resistor substantially identical to said first nonlinear resistor connected in parallel with a resistor having a value comparable to the resistance at a point in the upper region of said temperature characteristic.

4. In a keyed oscillator having a transistor with base, emitter and collector electrodes connected between a D.C. source potential and a reference potential, biasing means for stabilizing the output power of said oscillator over a range of ambient temperature variation including means for deriving a forward bias voltage magnitude varying inversely with temperature for application to said base and emitter electrodes comprising a first resistor connected to said source potential, a first thermistor exhibiting a negative temperature characteristic over said temperature range connected between said first resistor and said reference potential and a second resistor having a value comparable to the resistance of said thermistor at a point within the lower temperature region of said characteristic connected in parallel with said first thermistor and means for varying the base circuit impedance inversely with temperature connected between said base electrode and the junction of said first and second resistors comprising a second thermistor having identical characteristics with said first thermistor and a third resistor having a value comparable to the resistance of said thermistor at a point within the upper temperature region of said characteristics connected in parallel with said second thermistor.

5. A keyed feedback oscillator in accordance with claim 4 further including timing means and control means, said timing means being responsive to said control means to simultaneously connect said reference potential to said oscillator and said biasing means for a timed duration.

6. A keyed feedback oscillator in accordance with claim 5 wherein said timing means comprises the series connection between said reference potential and said control means of a relay having a set of transfer contacts and a thermistor having a negative temperature characteristic, said thermistor having a sufficiently large initial resistance value to prevent operation of said relay and a sufficiently low heated value to permit said relay to operate and wherein said transfer contacts are arranged to connect said reference potential to said biasing and oscillator circuits in response to said unoperated relay state and to disconnect said reference potential from said biasing and oscillator circuits and to short said thermistor in response to the operation of said relay.

No references cited.

ROY LAKE, *Primary Examiner.*

J. KOMINSKI, *Assistant Examiner.*